Aug. 10, 1943.                L. SNIDER                2,326,695
                            FISHPOLE HOLDER
                         Filed Nov. 14, 1942
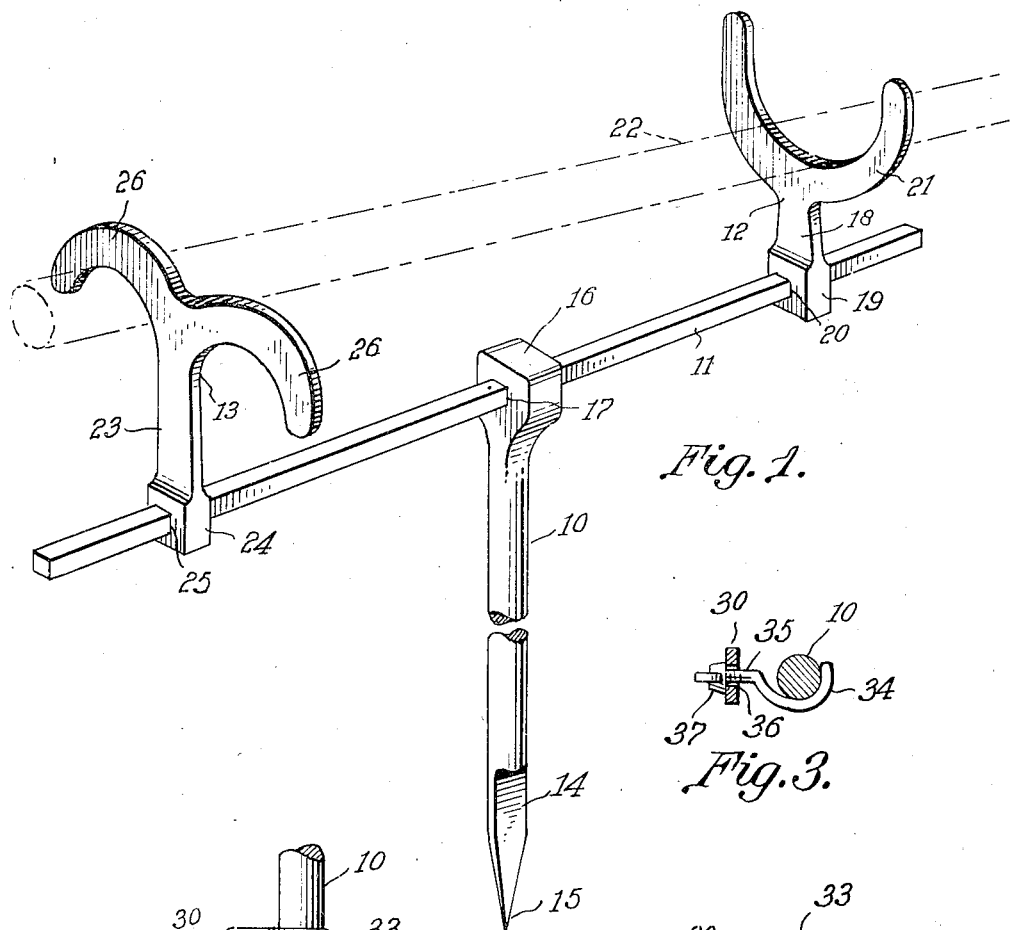
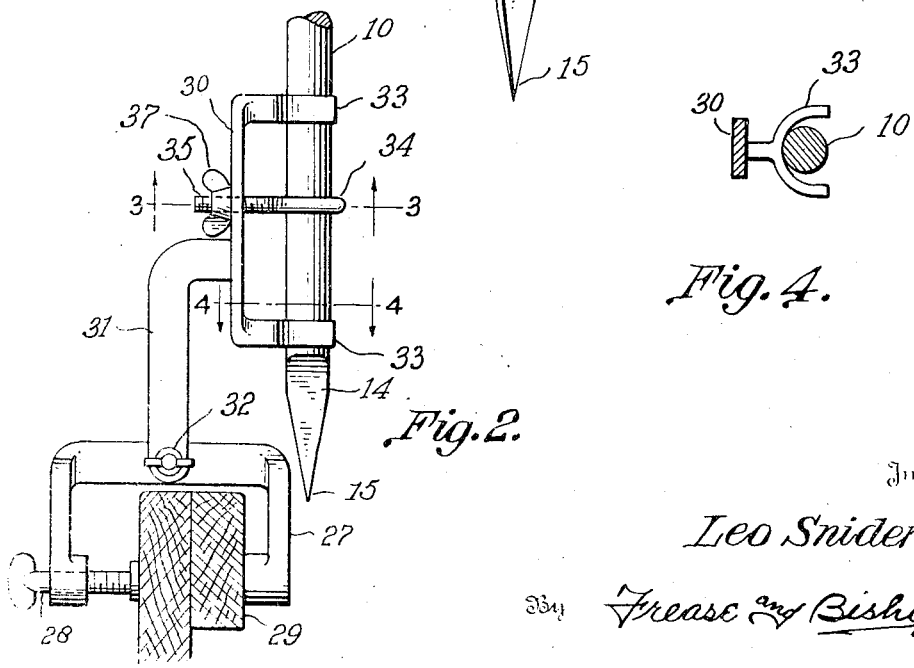
Inventor
Leo Snider
By Frease and Bishop
Attorneys Patented Aug. 10, 1943

2,326,695

UNITED STATES PATENT OFFICE 2,326,695

FISH POLE HOLDER

Leo Snider, Canton, Ohio

Application November 14, 1942, Serial No. 465,577

2 Claims. (Cl. 248—44)

The invention relates to fish pole holders and more particularly to a device adapted to be quickly and easily mounted upon the ground or upon a boat for holding a fishing pole or rod in any desired position.

After fishing for a considerable period of time, the continued holding of a fishing pole or rod becomes very tiresome, and fishermen often resort to various make shift devices for holding the pole or rod in position either on the shore or in a boat, such as by anchoring the handle portion of the pole by means of heavy stones or by wedging it under a seat of the boat, usually with more or less unsatisfactory results.

It is known that some devices have been used, to a limited extent, for holding fishing poles so that the fisherman may relax while fishing, but such devices as I have seen are more or less crude, are not capable of quick and easy adjustment, are not adapted for use both upon shore and upon boats, and are not so constructed that they can be knocked down and placed in a tackle box or other small space.

It is the object of the present invention to provide a fish pole holder which may be quickly and easily knocked down, and which comprises a plurality of parts of such size that they may be placed in a tackle box for transportation and storage.

Another object is the provision of such a fish pole holder that is easily and readily adjustable to hold a pole in any desired position.

A further object is to provide a device of this character which may be used either on land or upon a boat.

A still further object is to provide a simple and easily operated attachment for adjustably mounting the holder upon a boat.

Another object of the invention is to provide a fish pole holder of this character comprising a post or standard having a squared opening through its upper portion, a squared rod slidably located through said opening, a rest member having a squared opening slidably mounted upon the rod, and a hook member having a squared opening slidably mounted upon the rod, all of said parts being separable.

The above objects, together with others which will be apparent from the drawing and following description, or which may be later referred to, may be attained by constructing the improved fish pole holder in the manner illustrated in the accompanying drawing, in which—

Figure 1 is a perspective view of a fish pole holder constructed in accordance with the invention;

Fig. 2, an elevation of the adjustable attachment for mounting the holder upon a boat;

Fig. 3, a section taken on the line 3—3, Fig. 2; and

Fig. 4, a section taken on the line 4—4, Fig. 2.

Similar numerals refer to similar parts throughout the drawing.

The improved fish pole holder, as illustrated in Fig. 1, comprises four separable parts of such size and shape that when knocked down they may be easily stored in the ordinary tackle box for carrying small articles of fishing tackle, such as reels, lines, hooks, etc.

These four members comprise the supporting standard or post 10, the squared rod 11, the rest member 12, and the hook member 13, designed to be assembled in the manner shown in Fig. 1.

The standard, or post 10, may be of any cross-sectional shape, the lower end portion being preferably flattened, as shown at 14, so as to permit the same to be easily inserted into the ground, and terminates in the pointed extremity 15.

An enlarged head 16 is formed upon the upper end of the post, and is provided with an opening 17, which may be square, as shown in the drawing, or provided with at least one squared or flat side wall to prevent axial turning of the rod 11, when the same is located through said opening as shown in Fig. 1.

This rod 11 is of square, or other cross-sectional shape, corresponding to the shape of the opening 17, and is of such size that it will have a sliding fit through said opening.

The rest member 12 includes the shank portion 18, having the enlarged, or thickened base portion, 19, provided with a squared opening 20 of such shape and size that it will have a sliding fit upon the rod 11.

The rest portion 21, at the upper end of the shank 18, may be of substantially U-shape, and of such size that the handle portion of a fishing pole, or rod, may be easily accommodated therein, as shown in broken lines at 22, in Fig. 1.

The hook member 13 is also provided with a shank portion 23 having the enlarged or thickened base portion 24 in which is formed an opening 25 of the same cross-sectional shape as the rod 11, and of such size that it will slidably fit upon said rod.

This member is preferably provided with two oppositely disposed, downwardly directed hooks 26, beneath either of which the end of the fish pole handle may be inserted, in the manner shown in Fig. 1.

All of these parts may be made of any suitable material, preferably metal, and they may be stamped, forged, cast or otherwise formed to produce the desired size and shape.

In using the device to fish from the shore, the parts may be assembled in the manner shown in Fig. 1, and the sharpened end of the post is inserted into the ground to a sufficient depth to hold the device firmly in place, the rod 11 being so disposed that the rest member 12 is located toward the water.

The fish line may then be cast into the water and the handle portion of the fish pole 22 is placed in the rest 21 and the end thereof is inserted beneath one of the hooks 26, holding the pole in position so that the fisherman may watch the line or float and need not touch the fish pole except when he gets a bite.

When fishing from a boat, the post 10 may be inserted in an oar-lock and the device positioned so that the rest 21 is located outward, and the fish pole may be supported in the holder in the manner above described.

It will be seen that the improved fish pole holder is capable of a variety of adjustments to hold the pole in any desired position. After locating the post 10 in the desired position, and at the desired angle, the rod 11 may be adjusted longitudinally upon the post and the rest member and hook member may be independently adjusted upon the rod, relative to each other so as to hold the fish pole in any position and at any angle desired.

In Fig. 2 is shown an attachment which may be used for mounting the device upon the side or gunwale of a boat. This device comprises a C-clamp 27, having a clamping screw 28, for attachment to the gunwale 29, or other support.

The attaching bracket 30 is provided with an angular arm 31 adapted to be secured in any angular adjusted position upon the C-clamp as by the clamping screw 32, which is preferably in the form of a thumb screw for easy manual adjustment.

At each end of the bracket 30 is formed an angularly disposed, fork 33, arranged to accommodate the post 10, and intermediate of said forks is located a hook 35 arranged to engage over the post 10 and provided with a threaded straight shank 35 located through an aperture 36 in the bracket and adapted to be tightened by means of a thumb nut 37 for rigidly clamping the post upon the bracket.

When used with this attachment the various adjustments above described may be utilized, and furthermore the entire device may be held in any desired angular adjustment by means of the adjusting screw 32.

I claim:

1. A fish pole holder comprising a supporting post, a rod slidably adjustable upon said post at substantially a ninety degree angle thereto, a rest member slidably mounted upon the rod and arranged to receive and support the handle portion of a fish pole, and a hook member slidably mounted upon the rod and arranged to engage over the end of said handle portion to hold the fish pole in adjusted position.

2. A fish pole holder comprising a supporting post having a flat sided opening through its upper portion, a flat sided rod slidably adjustable through said opening, a rest member having a flat sided opening slidably receiving said rod, said rest member being arranged to receive and support the handle portion of a fish pole, and a hook member having a flat sided opening slidably receiving said rod and having a downwardly curved hook arranged to engage over the end of said handle portion to hold the fish pole in adjusted position.

LEO SNIDER.